US008902935B2

(12) United States Patent
Kim et al.

(10) Patent No.: US 8,902,935 B2
(45) Date of Patent: *Dec. 2, 2014

(54) SYNCHRONIZATION ACQUISITION METHOD AND APPARATUS IN MULTI-CARRIER SYSTEM

(75) Inventors: So Yeon Kim, Anyang-si (KR); Han Gyu Cho, Anyang-si (KR); Jae Hoon Chung, Anyang-si (KR); Sung Ho Moon, Anyang-si (KR); Seung Hee Han, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 218 days.

This patent is subject to a terminal disclaimer.

(21) Appl. No.: 13/379,342

(22) PCT Filed: Jun. 21, 2010

(86) PCT No.: PCT/KR2010/004006
§ 371 (c)(1),
(2), (4) Date: Dec. 19, 2011

(87) PCT Pub. No.: WO2010/147444
PCT Pub. Date: Dec. 23, 2010

(65) Prior Publication Data
US 2012/0099565 A1  Apr. 26, 2012

Related U.S. Application Data

(60) Provisional application No. 61/218,435, filed on Jun. 19, 2009.

(51) Int. Cl.
*H04J 3/06* (2006.01)
*H04J 11/00* (2006.01)
*H04L 5/00* (2006.01)
*H04L 27/26* (2006.01)
*H04W 28/08* (2009.01)
*H04W 72/00* (2009.01)

(52) U.S. Cl.
CPC ........ *H04L 27/2662* (2013.01); *H04L 27/2675* (2013.01); *H04J 11/0079* (2013.01); *H04L 5/0048* (2013.01); *H04W 28/08* (2013.01); *H04L 27/2656* (2013.01); *H04W 72/00* (2013.01); *H04L 5/001* (2013.01)
USPC ........... 370/512; 370/324; 370/350; 370/503; 370/514

(58) Field of Classification Search
None
See application file for complete search history.

(56) References Cited

U.S. PATENT DOCUMENTS

2003/0142764 A1   7/2003  Keevill et al.
2010/0260169 A1*  10/2010 Gheorghiu et al. ........... 370/350

(Continued)

FOREIGN PATENT DOCUMENTS

KR  10-2006-0099521   9/2006
KR  10-2007-0039760   4/2007

OTHER PUBLICATIONS

"Central Processing Unit." Pfaffenberger, Bryan. Webster's New World Computer Dictionary, Ninth Edition. New York: Hungry Minds, Inc., 2001, Print.*

*Primary Examiner* — Andrew Chriss
*Assistant Examiner* — Joshua A Kading
(74) *Attorney, Agent, or Firm* — Lee, Hong, Degerman, Kang & Waimey

(57) ABSTRACT

Provided are a synchronization acquisition method and apparatus in a multi-carrier system. A terminal acquires the synchronization for a first downlink component carrier by detecting a primary synchronization signal (PSS) and a secondary synchronization signal (SSS) in the first downlink component carrier. The terminal acquires the synchronization for a second downlink component carrier by detecting a reference signal in the second downlink component carrier.

14 Claims, 14 Drawing Sheets

(56) References Cited

U.S. PATENT DOCUMENTS

| | | |
|---|---|---|
| 2011/0129008 A1* | 6/2011 | Chmiel et al. ............... 375/224 |
| 2011/0223903 A1* | 9/2011 | Michel et al. .............. 455/422.1 |
| 2012/0033647 A1* | 2/2012 | Moon et al. .................. 370/336 |
| 2012/0093021 A1* | 4/2012 | Kim et al. .................... 370/252 |
| 2012/0122478 A1* | 5/2012 | Siomina et al. ............ 455/456.1 |
| 2013/0003585 A1* | 1/2013 | Siomina et al. ............... 370/252 |
| 2013/0039268 A1* | 2/2013 | Blankenship et al. ........ 370/328 |

* cited by examiner

Antenna 0

(A)

(B)

(A)

(B)

(A)

(B)

SYNCHRONIZATION ACQUISITION METHOD AND APPARATUS IN MULTI-CARRIER SYSTEM

CROSS-REFERENCE TO RELATED APPLICATIONS

This application is a 371 U.S. national stage application of International Application No. PCT/KR2010/004006, filed on Jun. 21, 2010, which claims priority to U.S. Provisional Application Ser. No. 61/218,435, filed on Jun. 19, 2009, the contents of which are incorporated by reference herein in their entirety.

TECHNICAL FIELD

The present invention relates to wireless communication and, more particularly, to a synchronization acquisition method and apparatus in a multiple carrier system.

BACKGROUND ART

3rd Generation Partnership Project (3GPP) Long Term Evolution (LTE) (i.e., the improvement of a Universal Mobile Telecommunications System (UMTS)) is introduced as 3GPP release 8. 3GPP LTE uses Orthogonal Frequency Division Multiple Access (OFDMA) in downlink and uses Single Carrier-Frequency Division Multiple Access (SC-FDMA) in uplink. Multiple Input Multiple Output (MIMO) having a maximum of 4 antennas is adopted. Recently, a discussion on 3GPP LTE-Advanced (LTE-A) which is the evolution of 3GPP LTE is in progress.

Technology introduced in 3GPP LTE-A includes a carrier aggregation, a relay, etc. A 3GPP LTE system is a single carrier system that supports only one bandwidth (i.e., one component carrier) of {1.4, 3, 5, 10, 15, 20} MHz. However, LTE-A is introducing multiple carriers employing a carrier aggregation. A component carrier is defined by a center frequency and a bandwidth. A multiple carrier system uses a plurality of component carriers having a smaller bandwidth than the entire bandwidth.

As a plurality of component carriers is used, backward compatibility with the existing system need to be guaranteed in some component carriers, but some component carriers may be designed to have higher efficiency without taking backward compatibility into consideration.

Synchronization acquisition is that user equipment performs synchronization for accessing a base station. In a multiple carrier system where various types of component carriers coexist, there is a need for a method of user equipment acquiring synchronization.

DISCLOSURE

Technical Problem

The present invention provides a synchronization acquisition method and apparatus employing a reference signal in a multiple carrier system.

The present invention provides a cell search method and apparatus for load balancing in a multiple carrier system.

Technical Solution

In an aspect, a method for acquiring synchronization in a multiple carrier system is provided. The method includes acquiring synchronization for a first downlink component carrier by detecting a primary synchronization signal (PSS) and a secondary synchronization signal (SSS) in the first downlink component carrier, receiving detection information for detecting a reference signal through the first downlink component carrier, and acquiring synchronization for a second downlink component carrier by detecting the reference signal in the second downlink component carrier.

The method may further include acquiring a physical cell identity (PCI) of the first downlink component carrier based on the PSS and the SSS.

The PCI of the second downlink component carrier may be identical with a PCI of the first downlink component carrier.

The method may further include acquiring a PCI of the second downlink component carrier based on the reference signal.

The method may further include instructing synchronization acquisition of the second downlink component carrier through the first downlink component carrier.

The detection information may include information about a PCI of the second downlink component carrier for detecting the reference signal.

The detection information may include information about positions of time domain resource or frequency domain resources for detecting the reference signal.

In another aspect, a user equipment for acquiring synchronization in a multiple carrier system includes a radio frequency (RF) unit configured to transmit and receive radio signals, and a processor coupled to the RF unit and configured to perform a cell search. The processor is configured to acquire synchronization for a first downlink component carrier by detecting a primary synchronization signal (PSS) and a secondary synchronization signal (SSS) in the first downlink component carrier, receive detection information for detecting a reference signal through the first downlink component carrier, and acquire synchronization for a second downlink component carrier by detecting the reference signal in the second downlink component carrier.

Advantageous Effects

In a multiple carrier system, load balancing between various types of component carriers can be obtained, and measurement or synchronization acquisition is possible in a component carrier where a synchronization signal does not exist.

MODE FOR INVENTION

A user equipment (UE) may be fixed or mobile and also be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device.

A Base Station (BS) commonly refers to a fixed station communicating with UEs, and it may be called another terminology, such as an evolved-NodeB (eNB), a Base Transceiver System (BTS), or an access point.

Each BS provides communication service to a specific geographical area (commonly called a cell). The cell may be classified into a plurality of areas (called sectors).

Hereinafter, downlink (DL) means communication from a BS to UE, and uplink (UL) means communication from UE to a BS. In downlink, a transmitter may be part of a BS, and a receiver may be part of UE. In uplink, a transmitter may be part of UE, and a receiver may be part of a BS.

Figure 1:
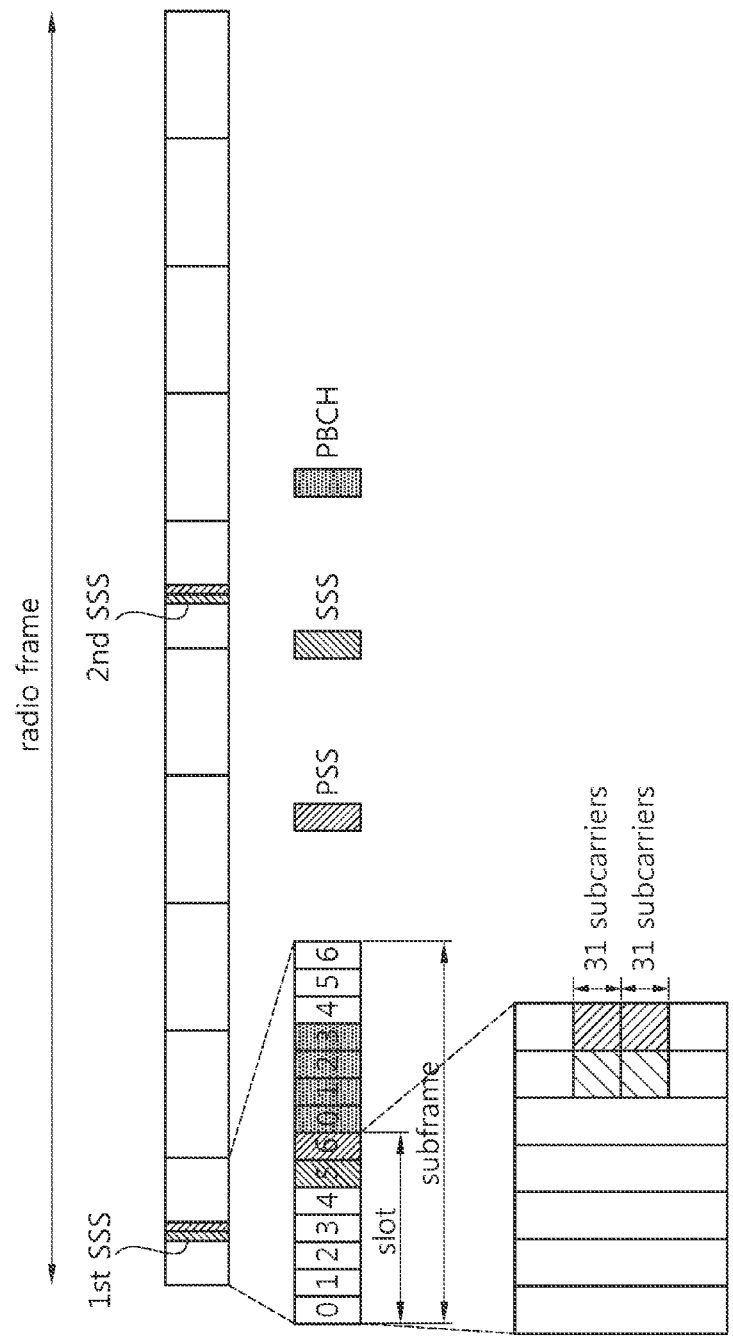
FIG. 1 shows the structure of a radio frame in 3GPP LTE.

FIG. 1 shows the structure of a radio frame in 3GPP LTE. For the structure of the radio frame, reference may be made to section 6 of 3GPP TS 36.211 V8.7.0 (2009-05) "Evolved Universal Terrestrial Radio Access (E-UTRA); Physical Channels and Modulation (Release 8)". The radio frame includes 10 subframes to which respective indices 0 to 9 are assigned, and one subframe includes two slots. The time that one subframe is taken to be transmitted is called a Transmission Time Interval (TTI). For example, the length of one subframe may be 1 ms, and the length of one slot may be 0.5 ms.

One slot may include a plurality of Orthogonal Frequency Division Multiplexing (OFDM) symbols in the time domain. The OFDM symbol is only for representing one symbol period in the time domain because 3GPP LTE uses Orthogonal Frequency Division Multiple Access (OFDMA) in downlink and is not restricted to a multiple access method or a name. For example, the OFDM symbol may be called another name, such as a Single Carrier Frequency Division Multiple Access (SC-FDMA) symbol or a symbol period.

One slot has been illustrated to include 7 OFDM symbols, but the number of OFDM symbols included in one slot may be changed depending on the length of a Cyclic Prefix (CP). In accordance with 3GPP TS 36.211 V8.7.0 (2009-05), one subframe includes 7 OFDM symbols in a normal CP and includes 6 OFDM symbols in an extended CP.

A Resource Block (RB) is a resource assignment unit, and it includes a plurality of subcarriers in one slot. For example, if one slot includes 7 OFDM symbols in the time domain and an RB includes 12 subcarriers in the frequency domain, one RB may include 7×12 Resource Elements (REs).

A Primary Synchronization Signal (PSS) is transmitted in the last OFDM symbol of a first slot (the first slot of a first subframe (a subframe having an index 0) and in the last OFDM symbol of an eleventh slot (the first slot of a sixth subframe (a subframe having an index 5). The same PSS is transmitted in two OFDM symbols. The PSS is used to obtain OFDM symbol synchronization or slot synchronization and is associated with a Physical Cell Identity (PCI).

A Secondary Synchronization Signal (SSS) includes a first SSS transmitted in an OFDM symbol prior to the last OFDM symbol of the first slot and a second SSS transmitted in an OFDM symbol prior to the last OFDM symbol of the eleventh slot. Unlike the PSS, different SSSs are transmitted in two OFDM symbols. The SSS is used to acquire frame synchronization. The SSS, together with the PSS, is used to obtain a PCI.

A Physical Broadcast Channel (PBCH) is transmitted in 4 former OFDM symbols of the second slot of a first subframe. The PBCH carries system information that is essential for UE to communicate with a BS. System information transmitted through the PBCH is called a Master Information Block (MIB). Meanwhile, system information transmitted through a Physical Downlink Shared Channel (PDSCH) indicated by a Physical Downlink Control Channel (PDCCH) is called a System Information Block (SIB).

Figure 2:
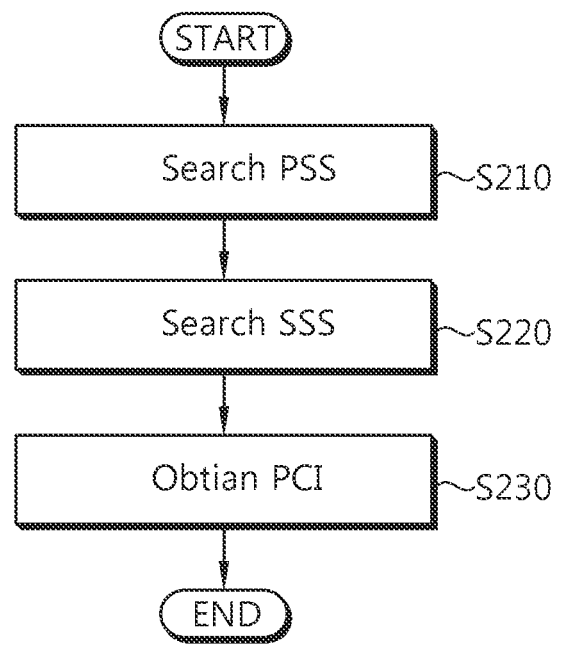
FIG. 2 is a flowchart showing a cell search process in 3GPP LTE.

FIG. 2 is a flowchart showing a cell search process in 3GPP LTE. A cell search is a process of UE obtaining time and frequency synchronization with a cell and obtaining the cell identifier of a cell.

A UE searches for a PSS (S210). The UE obtains slot synchronization through the PSS. Furthermore, the UE may obtain frequency synchronization through the PSS.

Next, the UE searches for an SSS (S220). The UE obtains frame synchronization through the SSS.

The PCI of the cell is obtained by using the SSS and the PSS (S230).

3GPP LTE includes 504 unique PCIS. The cell identifiers are grouped into unique PCI groups each including 168 PC's. Each PCI group has a unique identifier $N^{(2)}_{ID}$. Three PSSs are mapped to three identifiers $N^{(2)}_{ID}$, respectively.

As disclosed in section 6.11 of 3GPP TS 36.211 V8.7.0 (2009-05), a sequence $d_u(n)$ used in the PSS is generated from the following Zadoff-Chu (ZC) sequence.

$$d_u(n) = \begin{cases} e^{-j\frac{\pi u n(n+1)}{63}} & n = 0, 1, \ldots, 30 \\ e^{-j\frac{\pi u n(n+1)(n+2)}{63}} & n = 31, 32, \ldots, 61 \end{cases} \quad \text{Equation 1}$$

Here, the root index u of the ZC sequence is as follows.

TABLE 1

| $N^{(2)}_{ID}$ | Root index u |
|---|---|
| 0 | 25 |
| 1 | 29 |
| 2 | 34 |

The SSS includes a first SSS and a second SSS and consists of sequences in each of which the length of the two SSSs is 31 (referred to as a first Second Synchronization Code (SSC) $s_0$ and a second SSC $s_1$, respectively). The first SSS transmitted in a subframe 0 having an index 0 and the second SSS transmitted in a subframe 5 having an index 5 may be represented as follows.

$$d(2n) = \begin{cases} s_0^{(m0)}(n)c_0(n) & \text{in subframe 0} \\ s_1^{(m1)}(n)c_0(n) & \text{in subframe 5} \end{cases} \quad \text{Equation 2}$$

-continued $$d(2n+1) = \begin{cases} s_1^{(m1)}(n)c_1(n)z_1^{(m0)}(n) & \text{in subframe } 0 \\ s_0^{(m0)}(n)c_1(n)z_1^{(m1)}(n) & \text{in subframe } 5 \end{cases}$$

Here, $0 \leq n \leq 30$, $c_0(n)$, and $c_1(n)$ are scrambling sequences obtained on the basis of $N^{(2)}_{ID}$, and $z^{(m0)}_1$ and $z^{(m1)}_1$ are scrambling sequences obtained on the basis of m0 and m1.

According to Equation 2, the order of $s_0$ and $s_1$ of the first SSS and the second SSS is switched (i.e., the first SSS is the order of $s_0$ and $s_1$, but the second SSS is the order of $s_1$ and $s_0$), but the order of the scrambling sequences $c_0(n)$ and $c_1(n)$ is not switched.

The first $SSCs^{(m0)}_0$ and the second $SSC^{(m1)}_1$ are two different cyclic shifts of m-sequence $s(n)$ and are defined as follows.

$$s_0^{(m0)}(n) = s((n+m0) \bmod 31)$$

$$s_1^{(m1)}(n) = s((n+m1) \bmod 31) \quad \text{Equation 3}$$

Here, $s(i)=1-2x(i)$, $0 \leq 3 \leq 30$, $x(j+5)=(x(j+2)+x(j)) \bmod 2$, and $0 \leq j \leq 25$, and an initial condition $x(0)=0$, $x(1)=0$, $x(2)=0$, $x(3)=0$, $x(4)=1$.

The indices m0 and m1 are obtained on the basis of $N^{(2)}_{ID}$, and a combination of m0 and m1 has a range of 0 to 167. Accordingly, $N^{(1)}_{ID}$ within a PCI group is determined by the combination of the indices m0 and m1.

A UE receives a PSS and determines $N^{(2)}_{ID}$. Furthermore, the UE receives an SSS and determines $N^{(1)}_{ID}$ from m0 and m1. Consequently, the UE may determine the PCI $N^{cell}_{ID}$ of a specific cell as $N^{cell}_{ID} = N^{(1)}_{ID} + N^{(2)}_{ID}$.

The PCI $N^{cell}_{ID}$ is used to transmit various cell-specific signals and/or UE-specific signals. As disclosed in 3GPP TS 36.211 V8.7.0 (2009-05), the PCI $N^{cell}_{ID}$ is used in a Physical Uplink Shared Channel (PUSCH), an uplink reference signal, a Physical Control Format Indicator Channel (PCFICH), a Physical Downlink Control Channel (PDCCH), and a downlink reference signal.

The transmission of a downlink RS is described in detail.

A Reference Signal (RS) may be divided into a common RS and a dedicated RS. The common RS is a reference signal used by all the UEs within a cell and is used for channel measurement and/or data demodulation. The dedicated RS is a reference signal used by a specific UE or a specific UE group within a cell and is chiefly used for data demodulation.

A downlink reference signal in 3GPP LTE is described below.

Figure 3:
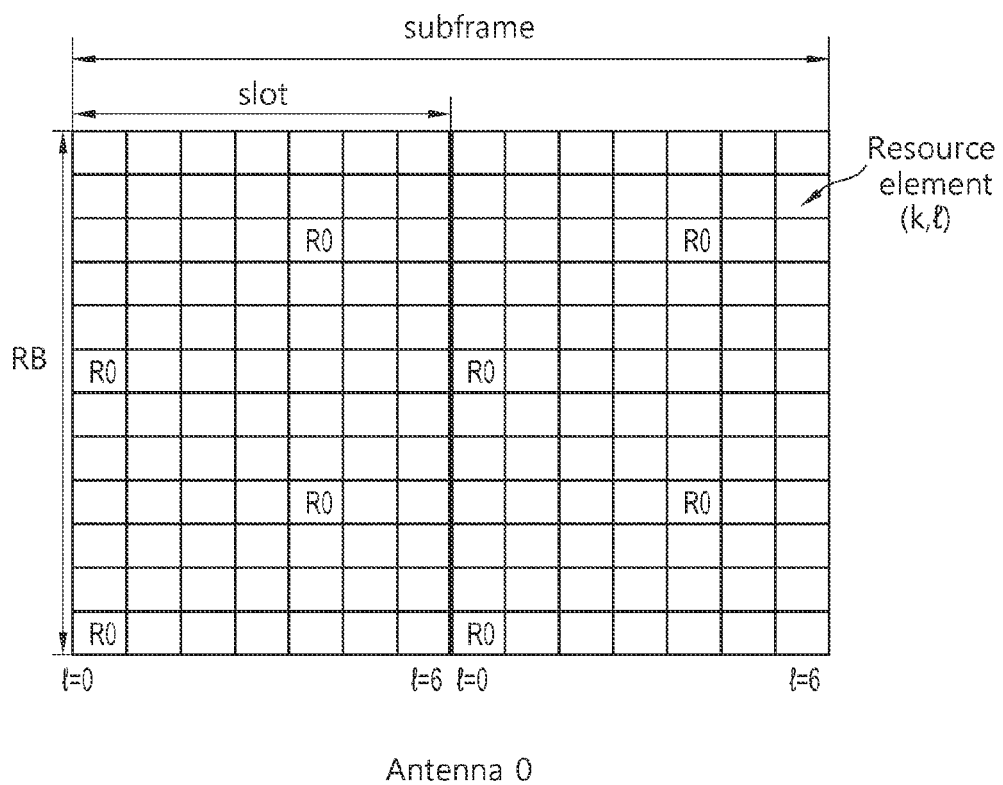
FIG. 3 shows an example of a common reference signal (RS) structure when a Base Station (BS) uses one antenna.
Figure 4:
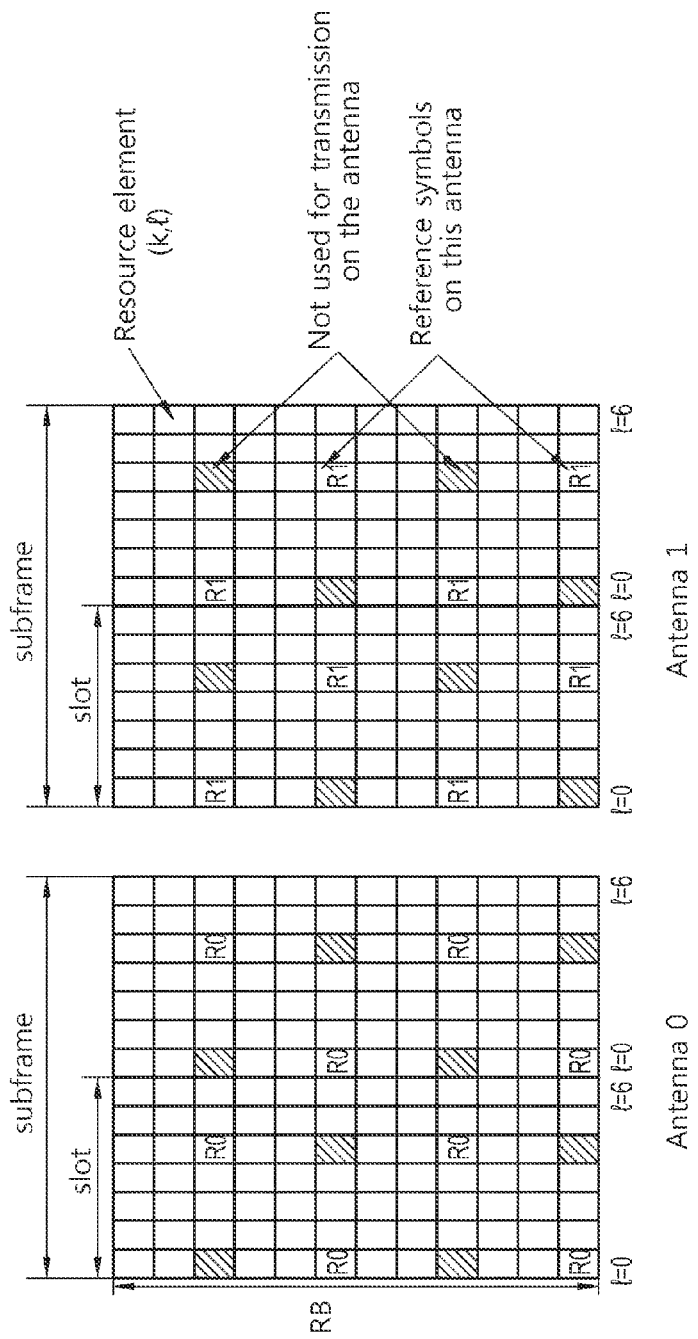
FIG. 4 shows an example of a common RS structure when a BS uses two antennas.
Figure 5:
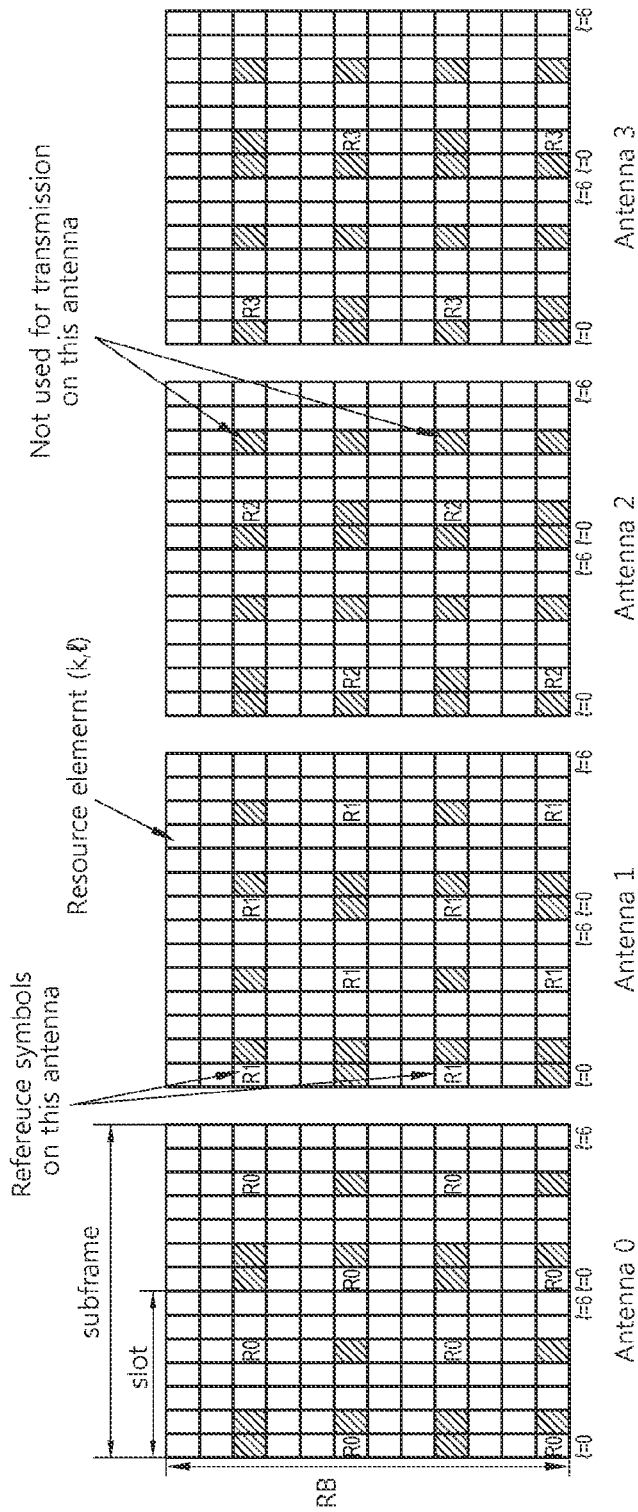
FIG. 5 shows an example of a common RS structure when a BS uses four antennas.

FIG. 3 shows an example of a common RS structure when a BS uses one antenna. FIG. 4 shows an example of a common RS structure when a BS uses two antennas. FIG. 5 shows an example of a common RS structure when a BS uses four antennas.

Referring to FIGS. 3 to 5, in case of multi-antenna transmission in which a BS uses a plurality of antennas, one resource grid exists in each antenna. 'R0' indicates an RS for a first antenna, 'R1' indicates an RS for a second antenna, 'R2' indicates an RS for a third antenna, and 'R3' indicates an RS for a fourth antenna. Positions of R0 to R3 within a subframe do not overlap with each other. l is the position of an OFDM symbol within a slot, and l has a value from 0 to 6 in a normal CP. In one OFDM symbol, an RS for each antenna is placed at an interval of 6 subcarriers. The number of R0s and the number of R1s within the subframe are identical with each other, and the number of R2s and the number of R3s within the subframe are identical with each other. Each of the number of R2s and the number of R3s within the subframe is smaller than each of the number of R0s and the number of R1s. A resource element used in the RS of one antenna is not used in the RS of another antenna in order to avoid inter-antenna interference.

The common RS is always transmitted by the number of antennas irrespective of the number of streams. The common RS has an independent reference signal for every antenna.

The position of the frequency domain and the position of the time domain within the subframe of the common RS are determined irrespective of UE. A common RS sequence multiplied to the common RS is generated irrespective of UE. Accordingly, all the UEs within a cell can receive the common RS. However, the position of the common RS within the subframe and the common RS sequence may be determined by a PCI. Accordingly, the common RS is also called a cell-specific RS.

The position of the time domain within the subframe of the common RS may be determined by the number of antennas and the number of OFDM symbols within a resource block. The position of the frequency domain within the subframe of the common RS may be determined by the number of antennas, a cell ID, an OFDM symbol index l, a slot number within a radio frame, etc.

The common RS sequence may be applied to each OFDM symbol within one subframe. The common RS sequence may vary according to a cell ID, a slot number within one radio frame, an OFDM symbol index within a slot, a type of a CP, etc.

The number of RS subcarriers for each antenna within a resource block on one OFDM symbol is 2. Assuming that a subframe includes $N^{DL}$ resource blocks in the frequency domain, the number of RS subcarriers for each antenna on one OFDM symbol is $2 \times N^{DL}$. Accordingly, the length of the common RS sequence becomes $2 \times N^{DL}$.

Equation bellows shows an example of the common RS sequence $r(m)$.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{Equation 4}$$

Here, $n_s$ is a slot number within a radio frame, l is an OFDM symbol number within a slot, and m is $0, 1, \ldots, 2N^{max,DL}-1$. $N^{max,DL}$ is the number of resource blocks corresponding to a maximum bandwidth. For example, in 3GPP LTE, $N^{max,DL}$ is 110.

A random sequence $c(i)$ may be defined by a gold sequence of length-31 as follows.

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2)x_1(n+1) + x_1(n)) \bmod 2 \quad \text{Equation 5}$$

Here, $n=0, 1, \ldots, 30$, $N_C = 1600$, $x_1(i)$ is a first m-sequence, and $x_2(i)$ is a second m-sequence.

The first m-sequence $x1(i)$ is reset to $x_1(0)=1$, $x_1(n)=0$, $n=0, 1, 2, \ldots, 30$, and the second m-sequence $x_2(i)$ is reset to $2^{10}(7(n_s+1)+l+1)(2N^{cell}_{ID}+1)+2N^{cell}_{ID}+Ncp$. $Ncp=1$ in a normal CP, and $Ncp=0$ in an extended CP.

A dedicated RS sequence may also be obtained by Equations 4 and 5. However, m in Equation 5 is defined by $N^{PDSCH}$ which is the number of resource blocks pertinent to a bandwidth corresponding to PDSCH transmission.

Since the PCI $N^{cell}_{ID}$ is used to initialize the downlink RS sequence as described above, it can be seen that a downlink reference signal is dependent on the PCI $N^{cell}_{ID}$.

Figure 6:
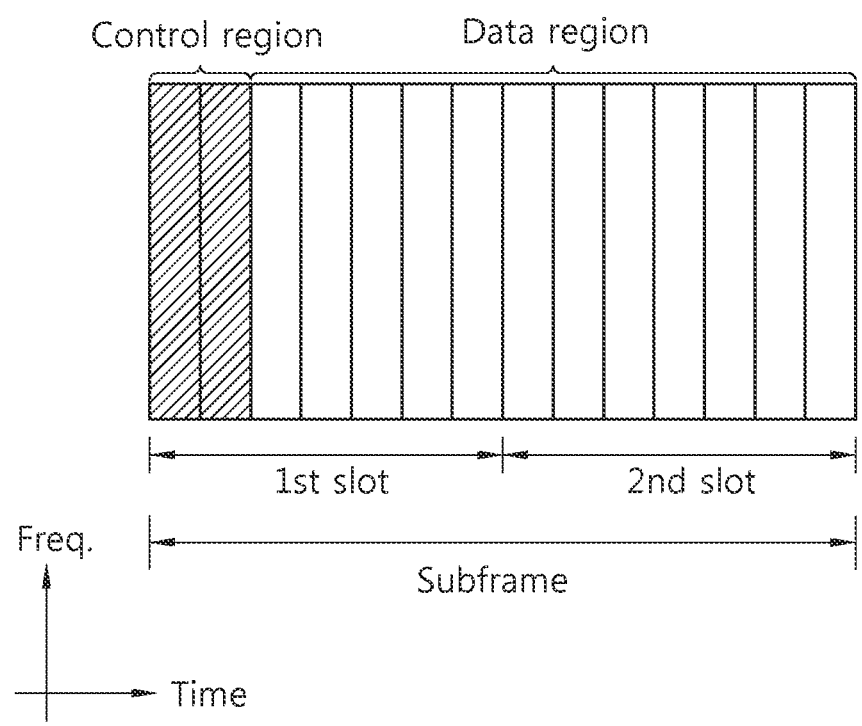
FIG. 6 shows the structure of a downlink subframe in 3GPP LTE.

FIG. 6 shows the structure of a downlink subframe in 3GPP LTE. A subframe is divided into a control region and a data region in the time domain. The control region includes a maximum of 3 former OFDM symbols of the first slot of the subframe, but the number of OFDM symbols included in the control region may be changed. A PDCCH is allocated to the control region, and a PDSCH is allocated to the data region.

A PCFICH transmitted through the first OFDM symbol of the subframe carries a Control Format Indicator (CFI) regarding the number of OFDM symbols (i.e., the size of the control region) which are used to transmit control channels within the subframe. UE first receives the CFI on the PCFICH and monitors a PDCCH.

A PHICH carries positive-acknowledgement (ACK)/negative-acknowledgement (NACK) signals for an uplink Hybrid Automatic Repeat Request (HARQ). The ACK/NACK signals for uplink data transmitted by UE are transmitted through the PHICH.

Control information transmitted through a PDCCH is called Downlink Control information (DCI). The DCI may include the resource allocation (also referred to as a DL grant) of a PDSCH, the resource allocation (also referred to as an UL grant) of a PUSCH, a set of transmission power control commands for individual UEs within a UE group and/or the activation of a Voice over Internet Protocol (VoIP).

As disclosed in section 9 of 3GPP TS 36.213 V8.7.0 (2009-05), blind decoding is used to detect the PDCCH. Blind decoding is a scheme for checking the owner or use of a PDCCH by demasking a specific identifier to the Cyclic Redundancy Check (CRC) of a received PDCCH (also referred to as a PDCCH candidate) and then checking a CRC error. UE monitors one or more PDCCHs for every subframe. Here, monitoring means that UE attempts to decode the PDCCH according to a monitored PDCCH format.

A multiple carrier system is described below.

A 3GPP LTE system supports a case where a downlink bandwidth and an uplink bandwidth are differently set, but one Component Carrier (CC) is a precondition for the case. This means that, in the state where one CC is defined for each of downlink and uplink, 3GPP LTE supports only a case where the downlink bandwidth is identical with or different from the uplink bandwidth. For example, the 3GPP LTE system may support a maximum of 20 MHz and have different uplink bandwidth and downlink bandwidth, but supports only one CC in each of uplink and downlink.

A spectrum aggregation (also called a bandwidth aggregation or a carrier aggregation) supports a plurality of CCs. The spectrum aggregation is introduced in order to support an increased throughput, prevent an increase of costs due to the introduction of a broadband Radio Frequency (RF), and guarantee compatibility with the existing system. For example, if 5 CCs are assigned as the granularity of a carrier unit having a 20 MHz bandwidth, a maximum bandwidth of 100 MHz can be supported.

CCs may have different sizes (i.e., bandwidths). For example, assuming that 5 CCs are used to configure a 70 MHz bandwidth, the 70 MHz bandwidth may be configured using a 5 MHz carrier (CC #0)+a 20 MHz carrier (CC #1)+a 20 MHz carrier (CC #2)+a 20 MHz carrier (CC #3)+a 5 MHz carrier (CC #4).

A case where the number of downlink CCs is identical with the number of uplink CCs or a downlink bandwidth is identical with an uplink bandwidth is called a symmetric aggregation. A case where the number of downlink CCs is different from the number of uplink CCs or a downlink bandwidth is different from an uplink bandwidth is called an asymmetric aggregation.

One or more Medium Access Control (MAC) entities may manage and operate one or more CCs and transmit and receive the one or more CCs. The MAC entity has a higher layer of a physical layer (PHY layer). For example, the MAC entity may have an MAC layer and/or a higher layer.

Figure 7:
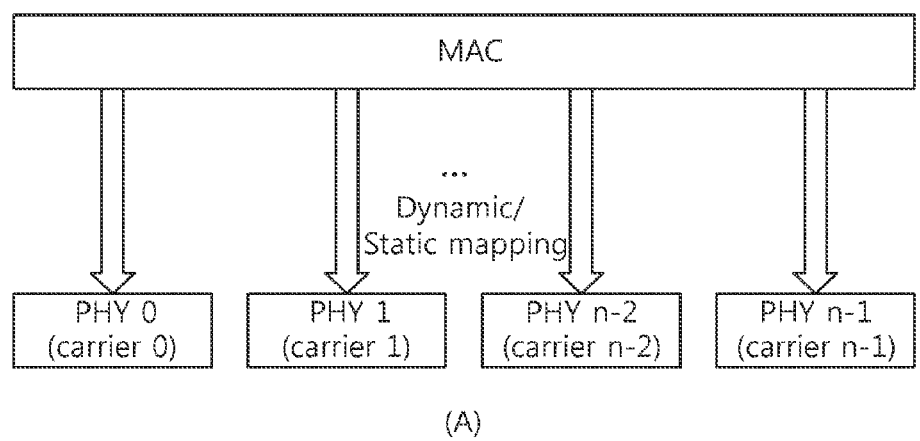
FIG. 7 shows an example of a transmitter and a receiver in which one MAC operates multiple carriers.
Figure 7:
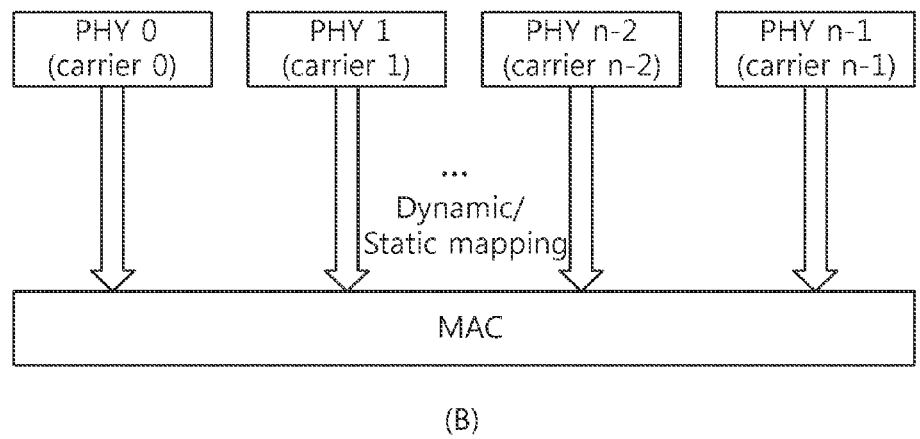

FIG. 7 shows an example of a transmitter and a receiver in which one MAC entity operates multiple carriers. The subfigure (A) shows the transmitter, and the subfigure (B) shows the receiver. One PHY layer corresponds to one CC, and a plurality of PHY layers PHY 0, . . . , PHY n-1 is operated by one MAC entity. Mapping between the MAC layer and the plurality of PHY layers PHY 0, . . . , PHY n-1 may be performed dynamically or statically.

Figure 8:
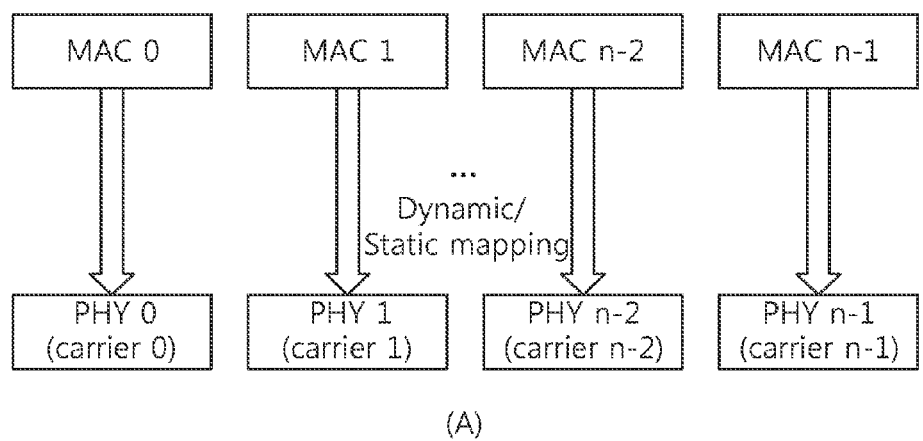
FIG. 8 shows an example of a transmitter and a receiver in which multi-MAC operates multiple carriers.
Figure 8:
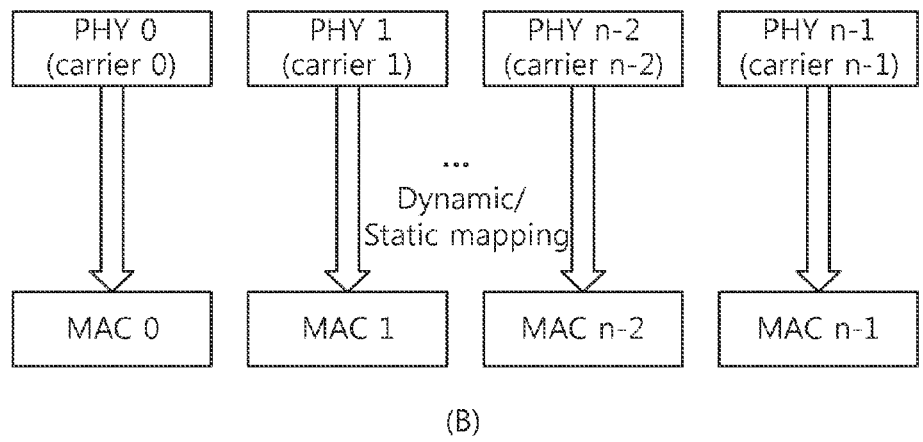

FIG. 8 shows another example of a transmitter and a receiver in which multiple MACs operate multiple carriers. Unlike in the example of FIG. 7, a plurality of MACs MAC 0, . . . , MAC n-1 is mapped to a plurality of PHY layers PHY 0, . . . , PHY n-1 in a 1:1 way.

Figure 9:
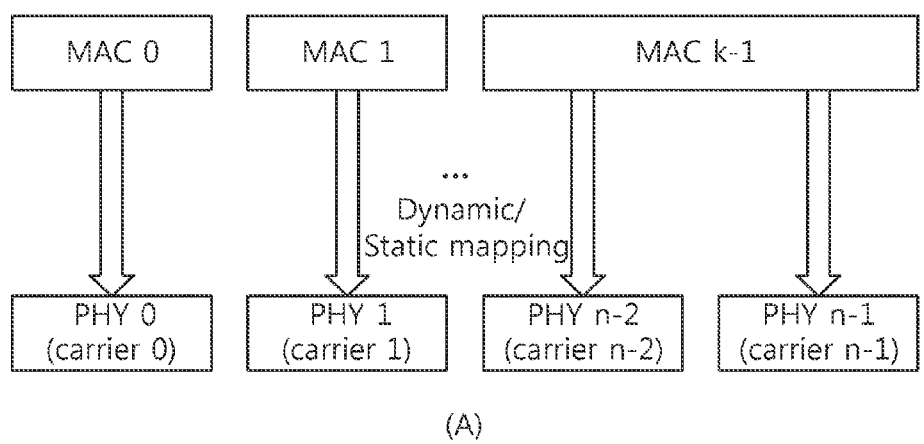
FIG. 9 shows another example of a transmitter and a receiver in which multi-MAC operates multiple carriers.
Figure 9:
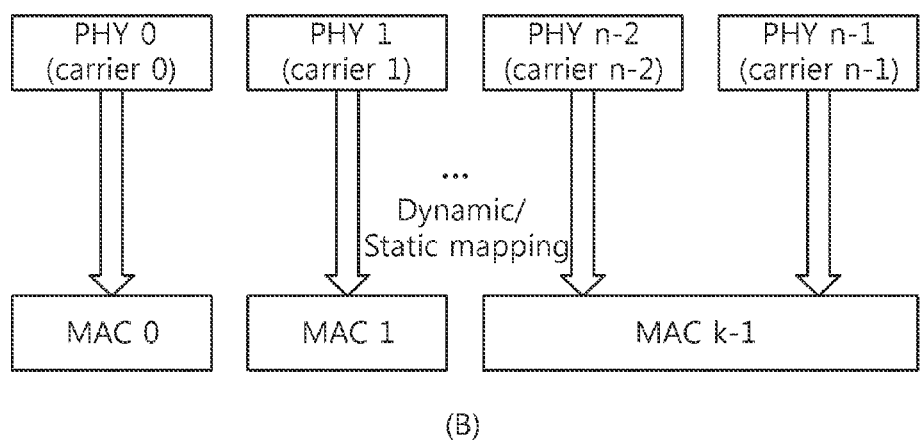

FIG. 9 shows yet another example of a transmitter and a receiver in which multiples MACs operate multiple carriers. Unlike in the example of FIG. 7, the total number of MACs k differs from the total number of PHY layers n. Some MACs MAC 0 and MAC 1 are mapped to respective PHY layers PHY 0 and the PHY 1 in a 1:1 way, and an MAC MAC k-1 is mapped to a plurality of PHY layers PHY n-2 and PHY n-2.

Figure 10:
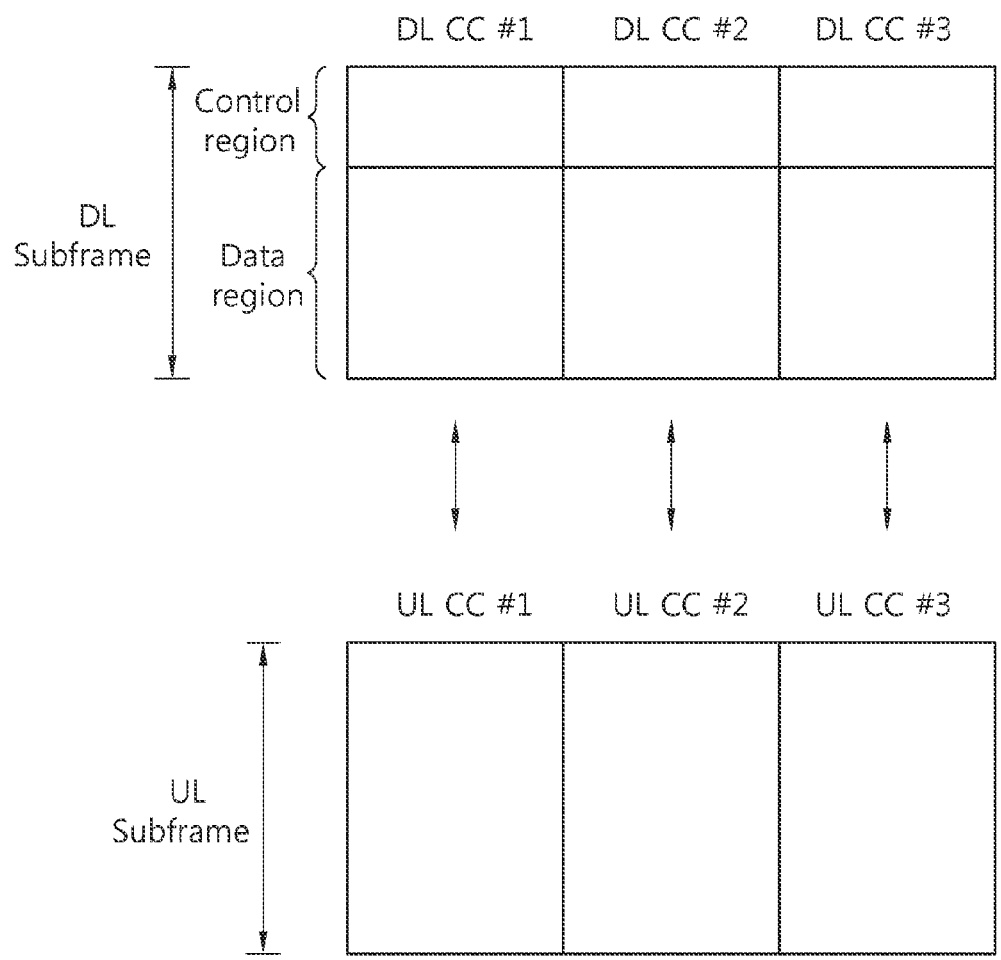
FIG. 10 shows an example of multiple carriers.

FIG. 10 shows an example of multiple carriers. Three DL CCs and three UL CCs are shown to exist, but the number of DL CCs and the number of UL CCs are not limited. A PDCCH and a PDSCH are independently transmitted in respective DL CCs, and a PUCCH and a PUSCH are independently transmitted in respective UL CCs. Alternatively, the control region may not be defined in a PDCCH because the PDCCH is not transmitted on any DL CC.

In a multiple carrier system, a linkage may be defined between a DL CC and a UL CC. The linkage may be configured based on E-UTRA Absolute Radio Frequency Channel Number (EARFCN) information included in downlink system information or may be configured by using a fixed DL/UL Tx/Rx separation relationship. The linkage refers to a mapping relationship between a DL CC on which a PDCCH carrying an UL grant is transmitted and a UL CC using the UL grant. Alternatively, the linkage may be a mapping relationship between a DL CC (or a UL CC) on which data for an HARQ is transmitted and a UL CC (or a DL CC) on which HARQ ACK/NACK signals are transmitted. A BS may inform UE of linkage information through a higher layer message, such as an RRC message, or part of system information. The linkage between the DL CC and the UL CC may be fixed, but a linkage between cells/UEs may be changed.

A proposed synchronization acquisition method is described below.

A Backward Compatible (BC) CC is a CC that provides backward compatibility to 3GPP LTE, supports operation based on 3GPP LTE, and uses the PHY structure of 3GPP LTE without change. The BC CC is also called an accessible CC. A PSS and an SSS are transmitted in the BC CC, and a PCI is acquired on the basis of the PSS and the SSS.

A Non-Backward Compatible (NBC) CC is a CC not providing backward compatibility to 3GPP LTE. A PSS and an SSS may not be transmitted in the NBC CC. In the NBC CC in which the PSS and the SSS are not transmitted, synchronization may be acquired by using an RS. Legacy UE supporting only 3GPP LTE cannot access the NBC CC in which the PSS and the SSS are not transmitted.

An example where the existing common RS is used as an RS used in synchronization acquisition is described below, but not limited thereto. A newly designed RS may be used in synchronization acquisition or measurement.

Figure 11:
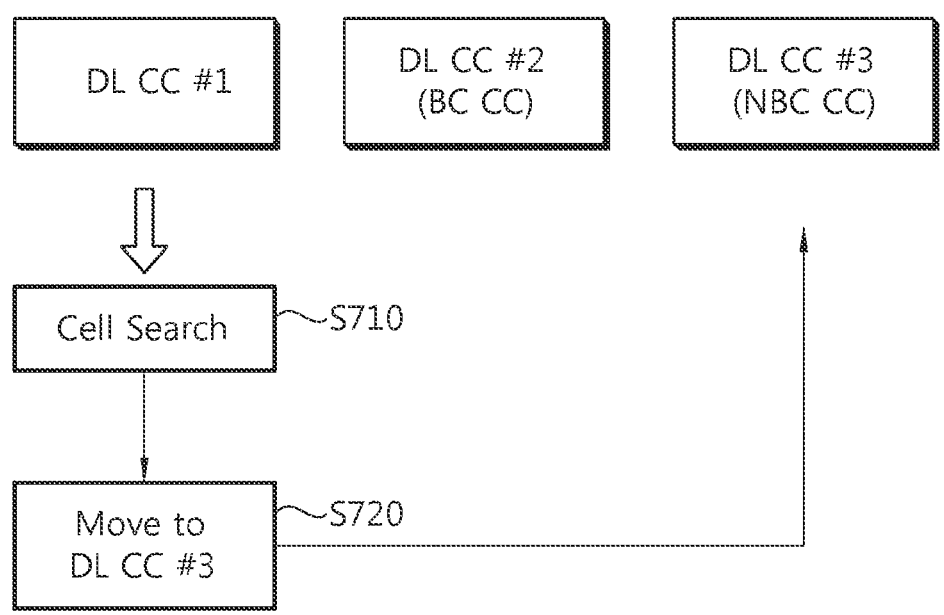
FIG. 11 shows a synchronization acquisition method according to an embodiment of present invention.

FIG. 11 shows a synchronization acquisition method according to an embodiment of present invention. There are three DL CCs. The DL CC #3 is an NBC CC, and a PSS and an SSS are not transmitted in the DL CC #3.

First, a UE searches for a PSS and an SSS through a DL CC #1 (S710). The PCI of the DL CC #1 may be acquired on the basis of the PSS and the SSS. A CC to which UE initially makes access and from which the UE acquires a PCI is called a primary CC.

A BS instructs to move to the DL CC #3 through the DL CC #1 (S720). The BS may transmit a CC indicator, indicating that the DL CC #3 is an NBC CC, to the UE through the DL CC #1.

The DL CC #3 is the NBC CC and may not be accessed by legacy UE. Accordingly, the BS may move the UE to the DL CC #3 and thus obtain load balancing. It is not preferred that all the UEs camps on a CC in which the PSS/SSS are transmitted.

In 3GPP LTE, after the PSS/SSS are detected, measurement is performed using a common RS. When synchronization is acquired through an RS, however, measurement may be directly performed by using the RS.

When UE initially camping on an NBC CC performs inter-frequency measurement, it is necessary to configure a measurement gap. This is because transmission and reception need to be stopped during the time for which the UE returns to the NBC CC after moving to a BC CC. Accordingly, at the early stage, it may be necessary to first access the BC CC.

Figure 12:
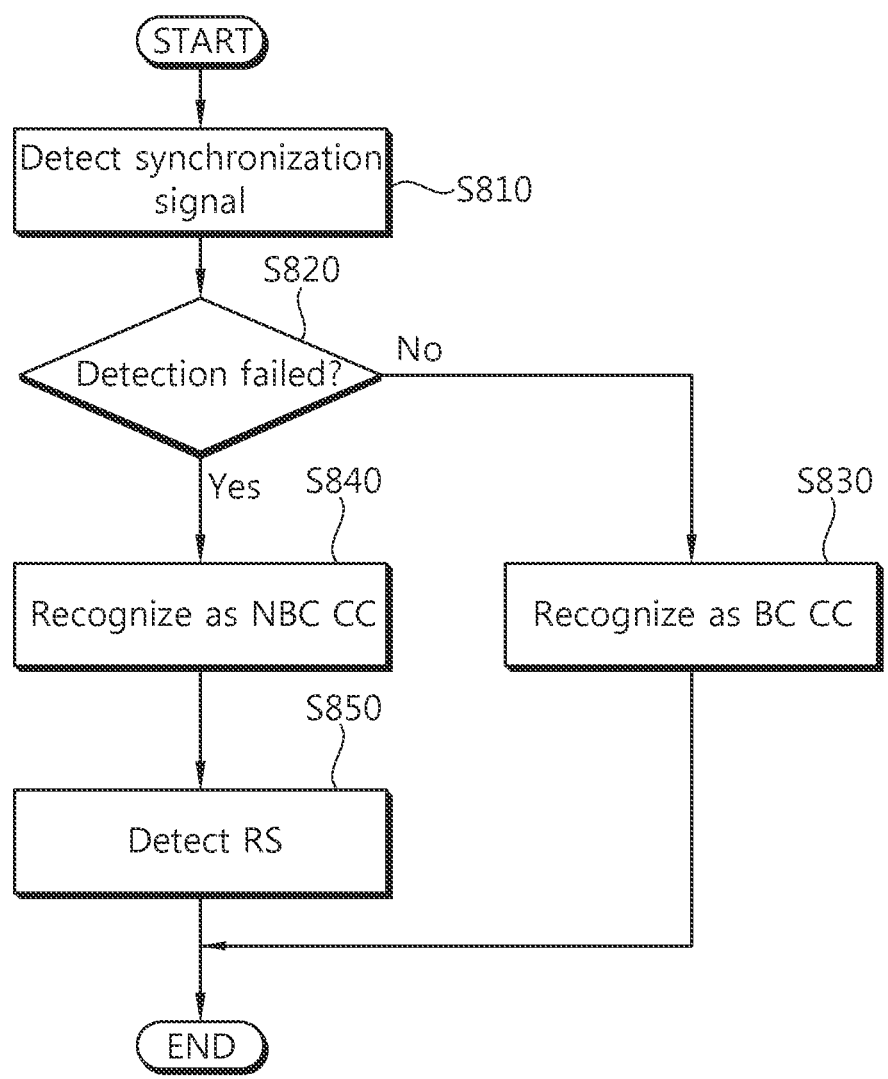
FIG. 12 shows a synchronization acquisition method according to another embodiment of present invention.

FIG. 12 shows a synchronization acquisition method according to another embodiment of present invention.

A UE attempts to detect a synchronization signal for DL CCs (S810). The UE may attempt to detect the synchronization signal for all possible DL CCs. The UE does not know whether a DL CC that the UE makes an attempt at synchronization detection is a BC CC or an NBC CC.

If the detection of the synchronization signal is successful, the UE acquires a PCI on the basis of a PSS and an SSS and recognizes the relevant DL CC as a BC CC (S830).

If the detection of the synchronization signal is unsuccessful (S820), the UE recognizes the relevant DL CC as an NBC CC (S840). Next, the UE detects an RS and attempts synchronization acquisition (S850).

The above process may be applied to not only a synchronization acquisition process, but also a cell selection/reselection process or an adjacent cell measurement process including a synchronization acquisition process without change.

Figure 13:
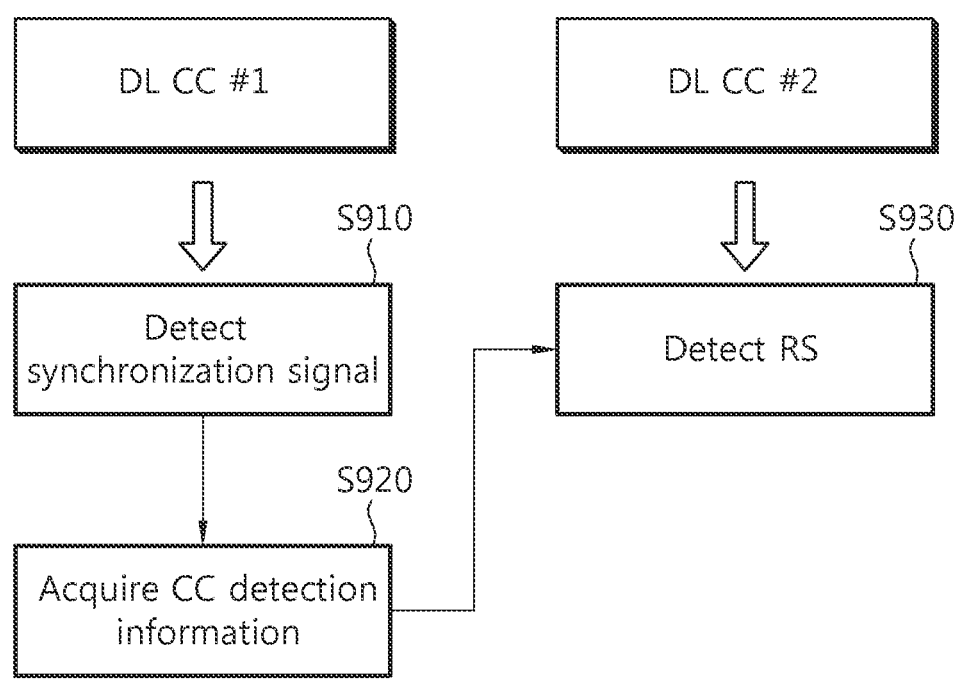
FIG. 13 shows a synchronization acquisition method according to yet another embodiment of present invention.

FIG. 13 shows a synchronization acquisition method according to yet another embodiment of present invention. A DL CC #1 is a BC CC, a DL CC #2 is an NBC CC, and a PSS and an SSS are not transmitted in the DL CC #2.

First, UE searches for a PSS and an SSS through the DL CC #1 (S910). The PCI of the DL CC #1 may be acquired on the basis of the PSS and the SSS.

The UE acquires CC detection information for the synchronization detection and/or measurement of the DL CC #2 through the DL CC #1 (S920). The UE may obtain the CC detection information from the physical characteristics of the DL CC #1, such as the PCI and CP of the DL CC #1. Alternatively, the CC detection information may be transmitted from a BS to the UE through an RRC message, system information, or L1/L2 signaling.

The UE acquires synchronization or performs measurement by detecting the RS of the DL CC #2 on the basis of the CC detection information (S930).

The RS used in the synchronization acquisition or measurement of an NBC CC may have a new structure or employ the structure of the existing 3GPP LTE without change.

The above synchronization acquisition method may be applied to a cell search process. A cell search includes an initial cell search for enabling UE to initially attempt to access a cell and a cell re-search for enabling UE to move to another cell while accessing a cell. The cell search includes the initial cell search and the cell re-search.

As described above, the downlink RS of 3GPP LTE is defined by Equations 4 and 5 and initialized by $210(7(n_s+1)+/+1+1)(2N^{cell}_{ID}+1)+2N^{cell}_{ID}+Ncp$. Accordingly, in order to detect the RS, UE may attempt blind detection for parameters ns, I, $N^{cell}_{ID}$, and Ncp depending on all possible cases. $N^{cell}_{ID}$ and/or Ncp of an NBC CC may be determined through the blind detection.

In order to reduce the number of blind detections, the following methods may be used.

The positions of time domain resources and/or frequency domain resources at which a detection attempt is made may be limited. For example, ns and/or are limited to specific values. Alternatively, CC detection information may include information about the positions of the time domain resources and/or the frequency domain resources.

The range of a PCI at which a detection attempt is made may be limited. Alternatively, a PCI at which a detection attempt is made may be determined on the basis of the PCI of a primary CC or the PCI of a BC CC previously detected. For example, the range of a PCI at which a detection attempt is made may include a minimum value or a maximum value of the PCI of a BC CC previously detected. Alternatively, the CC detection information may include information about a PCI at which a detection attempt is made.

Ncp may be determined the basis of the CP of a primary CC or the CP of a BC CC previously detected. The primary CC is a normal CP, and Ncp is also set to a value for the normal CC. Alternatively, the CC detection information may include information about Ncp.

Figure 14:
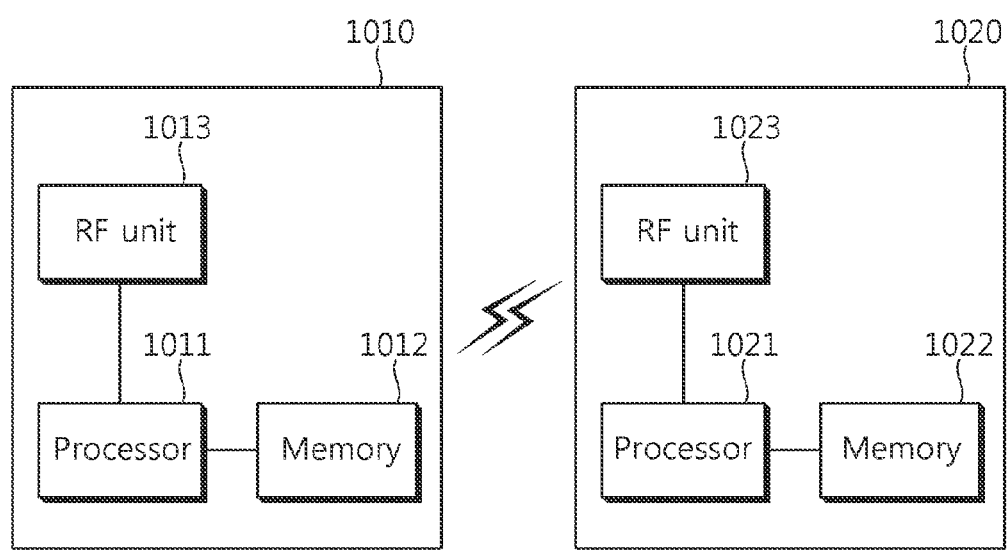
FIG. 14 is a block diagram showing wireless apparatuses in which the embodiments of present invention are implemented.

FIG. 14 is a block diagram showing wireless apparatuses in which the embodiments of present invention are implemented.

A UE 1010 includes a processor 1011, memory 1012, and a Radio Frequency (RF) unit 1013. The memory 1012 stores parameters for the operation of the processor 1011. The RF unit 1013 transmits and receives radio signals. The processor 1011 supports multiple carriers and implements the operations of the UE in the above embodiments.

The processor 1011 may acquire synchronization by detecting a PSS and an SSS in a BC CC and determine a PCI. The processor 1011 may acquire synchronization by detecting an RS in an NBC CC.

The PCI of the NBC CC may be the same as the PCI of the BC CC. Alternatively, the PCI of the NBC CC may be acquired from the RS.

The synchronization acquisition of the NBC CC may be indicated through the BC CC.

The processor 1011 may acquire detection information for detecting the RS of the NBC CC through the BC CC. The detection information may include information about the PCI of the NBC CC. The detection information may include information about the positions of time domain resources and/or frequency domain resources for detecting the RS.

A BS 1020 includes a processor 1021, memory 1022, and an RF unit 1023. The memory 1022 stores parameters for the operation of the processor 1021. The RF unit 1023 transmits and receives radio signals. The processor 1021 supports multiple carriers and implements the operations of the BS in the above embodiments.

The processor 1021 may configure a BC CC and an NBC CC from among a plurality of DL CCs. The processor 1021 may instruct movement to the NBC CC or the measurement of the NBC CC through the BC CC.

The processor 1021 may transmit detection information for detecting the RS of the NBC CC to UE through the BC CC.

The processor may include Application-Specific Integrated Circuits (ASICs), other chipsets, logic circuits, and/or data processors. When the above-described embodiment is implemented in software, the above-described scheme may be implemented using a module (process or function) which performs the above function.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

1. A method for acquiring synchronization in a multiple carrier system, the method performed by one user equipment (UE) and comprising:
    acquiring, by the UE capable of aggregating a plurality of downlink component carriers and aggregating a plurality of uplink component carriers up to 100 MHz, synchronization for a first downlink component carrier among the plurality of downlink component carriers by detecting a primary synchronization signal (PSS) and a secondary synchronization signal (SSS) in the first downlink component carrier, wherein each of the plurality of downlink component carriers provides a physical Downlink Control Channel (PDCCH) in which downlink control information (DCI) is conveyed;
    receiving, by the UE, detection information for detecting a reference signal in a second downlink component carrier among the plurality of downlink component carriers through the first downlink component carrier;
    attempting, by the UE, to detect a PSS and a SSS in the second downlink component carrier; and
    when the detection of the PSS and the SSS in the second downlink component carrier fails, acquiring, by the UE, synchronization for the second downlink component carrier, in which the PSS and the SSS are not transmitted, by detecting the reference signal in the second downlink component carrier based on the detection information for detecting the reference signal in the second downlink component carrier.

2. The method of claim 1, further comprising:
    acquiring a physical cell identity (PCI) of the first downlink component carrier based on the PSS and the SSS in the first downlink component carrier.

3. The method of claim 2, wherein the PCI of the second downlink component carrier is identical with a PCI of the first downlink component carrier.

4. The method of claim 1, further comprising:
    acquiring a PCI of the second downlink component carrier based on the reference signal in the second downlink component carrier.

5. The method of claim 1, further comprising:
    instructing synchronization acquisition of the second downlink component carrier through the first downlink component carrier.

6. The method of claim 1, wherein the detection information comprises information about a PCI of the second downlink component carrier for detecting the reference signal.

7. The method of claim 1, wherein the detection information comprises information about positions of time domain resource or frequency domain resources for detecting reference signals.

8. A user equipment for acquiring synchronization in a multiple carrier system, comprising:
    a radio frequency (RF) unit configured to be capable of aggregating a plurality of downlink component carriers and aggregating a plurality of uplink component carriers up to 100 MHz and to transmit and receive radio signals, wherein each of the plurality of downlink component carriers provides a physical Downlink Control Channel (PDCCH) in which downlink control information (DCI) is conveyed;
    a processor coupled to the RF unit and configured to perform a cell search; and
    a memory unit configured to store information for operating the processor,
    wherein the processor is configured to:
    acquire synchronization for a first downlink component carrier among the plurality of downlink component carriers by detecting a primary synchronization signal (PSS) and a secondary synchronization signal (SSS) in the first downlink component carrier,
    receive detection information for detecting a reference signal in a second downlink component carrier among the plurality of downlink component carriers through the first downlink component carrier,
    attempt to detect a PSS and a SSS in a second downlink component carrier; and
    when the detection of the PSS and the SSS in the second downlink component carrier fails, acquire synchronization for the second downlink component carrier, in which the PSS and the SSS are not transmitted, by detecting the reference signal in the second downlink component carrier based on the detection information for detecting the reference signal in the second downlink component carrier.

9. The user equipment of claim 8, wherein the processor is configured to acquire a physical cell identity (PCI) of the first downlink component carrier based on the PSS and the SSS.

10. The user equipment of claim 9, wherein the PCI of the second downlink component carrier is identical with a PCI of the first downlink component carrier.

11. The user equipment of claim 8, wherein the processor is configured to acquire a PCI of the second downlink component carrier based on the reference signal in the second downlink component carrier.

12. The user equipment of claim 8, wherein the processor is configured to instruct synchronization acquisition of the second downlink component carrier through the first downlink component carrier.

13. The user equipment of claim 8, wherein the detection information comprises information about a PCI of the second downlink component carrier for detecting the reference signal.

14. The user equipment of claim 8, wherein the detection information comprises information about positions of time domain resource or frequency domain resources for detecting reference signals.

* * * * *